United States Patent [19]

Suzuki

[11] Patent Number: 4,924,383

[45] Date of Patent: May 8, 1990

[54] METHOD AND APPARATUS FOR MEASURING PERFORMANCE OF A MULTIPROCESSOR

[75] Inventor: Kaoru Suzuki, Hadano, Japan

[73] Assignee: Hitachi, Ltd., Tokyo, Japan

[21] Appl. No.: 215,788

[22] Filed: Jul. 6, 1988

[30] Foreign Application Priority Data

Jul. 6, 1987 [JP] Japan ................................ 62-168438

[51] Int. Cl.⁵ ...................... G06F 15/16; G06F 11/30
[52] U.S. Cl. ................................ 364/200; 364/228.1; 364/228.3; 364/230; 364/230.4; 364/264; 364/264.1
[58] Field of Search ........................ 364/200, 300, 900

[56] References Cited

U.S. PATENT DOCUMENTS 4,591,967  5/1986  Mattes et al. .................. 364/200 X

FOREIGN PATENT DOCUMENTS 61-103254  4/1984  Japan .

*Primary Examiner*—Raulfe B. Zache
*Attorney, Agent, or Firm*—Antonelli, Terry & Wands

[57] ABSTRACT

A method for measuring performance of a multiprocessor having a plurality of processors and a resource shared by the processors. A master processor extracts, from an external unit, variable measurement data for creating a competition state in which the common resource is accessed by the master processor and other slave processors, and sets operation environment of the master processor and the slave processors. The master processor activates the slave processors and the master processor operates in synchronism with the slave processors to create the competition state. The master processor measures an instruction execution time under the competition state to measure the performance.

7 Claims, 5 Drawing Sheets

| | |
|---|---|
| FORMAT OF INSTRUCTION TO BE TESTED | ~201 |
| CODE OF INSTRUCTION TO BE TESTED | ~202 |
| FORMAT OF COMPETING INSTRUCTION | ~203 |
| CODE OF COMPETING INSTRUCTION | ~204 |
| COMPETITION STATE | ~205 |
| PURGE RAM | ~206 |
| INFORMATION ON COMPETING ADDRESS | ~207 |

METHOD AND APPARATUS FOR MEASURING PERFORMANCE OF A MULTIPROCESSOR

BACKGROUND OF THE INVENTION

The present invention relates to a system for measuring performance of a multiprocessor computer system, and more particularly to method and apparatus for measuring performance of a multiprocessor suitable for a large scale computer system having a complex parallel processing function.

The multiprocessor computer system shares a function associated with a storage by a plurality of instruction processors. Thus, if competition occurs during processing, processing between the processors performance of the computer system is lowered. In the past, a method for exactly evaluating the performance of such a system has not been established; further performance characteristics can only be partially grasped by hardware which monitors operation of the system using hardware or a bench mark test which compares processing times of the same job by a single processor and a multiprocessor.

The above technology is described in Japanese Patent Unexamined Publication 61-103254.

The prior art method does not taken into consideration the measurement of the performance of the system when processing competition occurs among a plurality of instruction processors in the multiprocessor computer system. Hence the prior art method is not capable of precisely grasping the performance of the multiprocessor system particularly when competition occurs during processing operations.

SUMMARY OF THE INVENTION

It is an object of the present invention to provide a method and apparatus for measuring performance of a multiprocessor computer system having a plurality of processors, wherein various competitions occur among the processors, and for measuring performance of instruction execution in the competition state and precisely measuring the system performance.

In accordance with the present invention, in the multiprocessor computer system having a plurality of processors, data input means for inputting data on measurement environment is provided in a master processor which sets data to be supplied to the computer system. A status control unit for extracting measurement data through the data input means and setting the measurement data in resources including a main storage, and an environment setting unit in a slave processor for activating the slave processor in accordance with the operation environment set under a start command from the status control unit are provided. A command is sent to the environment setting unit under control of the status control unit to activate the slave processor, and a master processor is operated in synchronism with the slave processor in accordance with the environment to create a competition state. Under this competition state, the instruction execution time is measured by the master processor to measure the performance of the system under the competition state.

By setting measuring data in the main storage, buffer storage or data shared by processors etc., as competing resources, and varying a degree of synchronization or timing between the master processor and the slave processor, various competition states may be generated so that the performance of the multi-processor in various competition states can be measured.

The functions of the status control unit, environment setting unit and performance measurement unit can be implemented by either a program or a hardware.

In accordance with the present invention, the performance characteristic in the competition state of the processing among a plurality of instruction processors can be precisely measured so that the performance of the multiprocessor computer system can be precisely obtained. When the present invention is implemented by software, the instruction execution performance for a specific instruction under various competition states or overhead in the instruction execution under the competition state can be compared with the instruction execution performance under non-competition states or they can be calculated. The present system can be easily implemented by program and the performance can be evaluated whatever the computer system configuration.

BRIEF DESCRIPTION OF THE DRAWINGS

These and other objects and advantages of the present invention will become apparent by reference to the following description and accompanying drawings wherein.

DESCRIPTION OF THE PREFERRED EMBODIMENTS

One embodiment of the present invention is now explained in detail with reference to the drawings.

Figure 1:
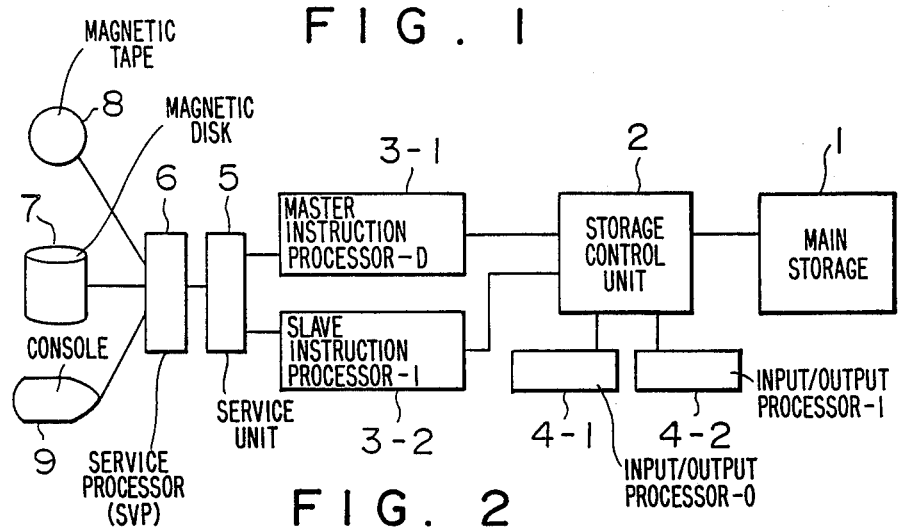
FIG. 1 shows a hardware configuration of a computer system to which the present invention is applied.

FIG. 1 shows a schematic hardware configuration of a computer system to which the present invention is applied. In FIG. 1, two instruction processors (IP) 3-1 and 3-2 and input/output processors (IOP) 4-1 and 4-2 share a storage control unit (SCU) 2 and a main storage (MS) 1. Each of the instruction processors 3-1 and 3-2 is connected to a service processor (SVP) 6 through a service unit (SVU) 5, and a magnetic disk 7 is connected to the service processor 6 as an external storage for storing measurement data. The external storage may be a magnetic tape unit 8, or the measurement data may be entered from a console 9 by an operator.

In FIG. 1, let us assume that the instruction processor 3-1 is a master instruction processor, the instruction processor 3-2 is a slave processor, and the access of the instruction processor 3-1 to the storage 1 competes with the instruction processor 3-2. One of the processors which is used by the operator to input the data into the computer system is defined as the master processor.

Figure 2:
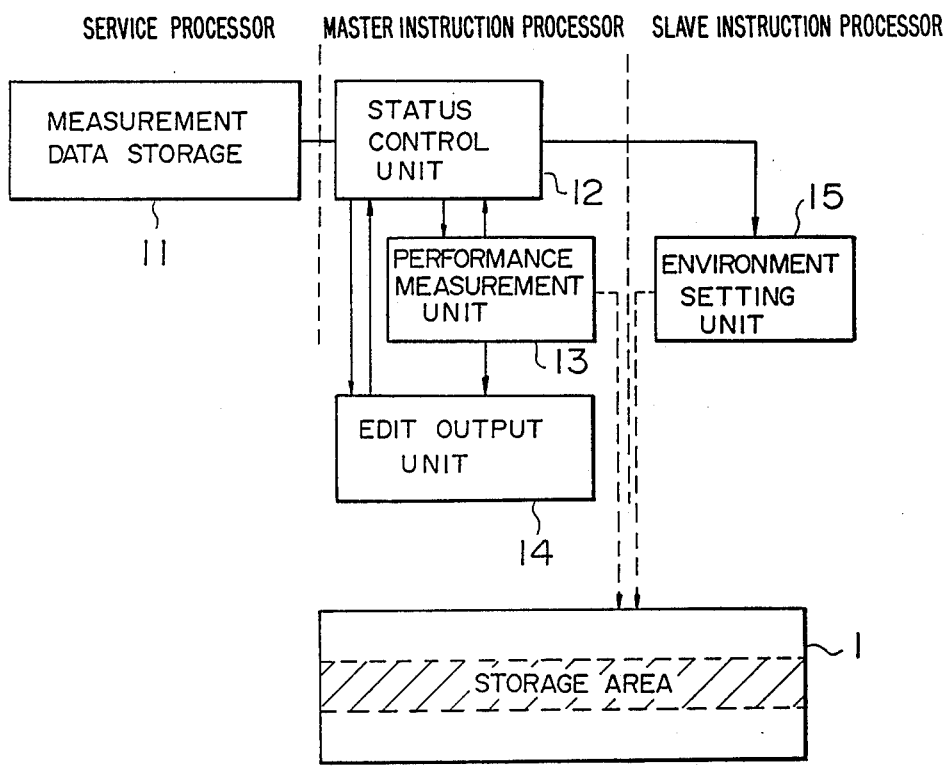
FIG. 2 shows a functional block diagram of one embodiment of a performance measurement system of the present invention.

FIG. 2 shows a functional block diagram of one embodiment of the performance measurement system of the present invention. In FIG. 2, a measurement data storage 11 is provided in the magnetic disk storage 7 of the service processor 6, a status control unit 12, a performance measurement unit 13 and an edit output unit 14 are provided in the master instruction processor 3-1, and an environment setting unit 15 is provided in the slave instruction processor 3-2. If the processor 3-2 is master and the processor 3-1 is slave, the above relations are reversed.

The status control unit 12, performance measurement unit 13, edit output unit 14 and environment setting unit 15 may be implemented by either software or hardware.

The measurement data storage 11 stores instructions to be measured and information necessary for initializing the measurement environment (initialization of the system operation environment and pattern of occurrence of the processing competition state). The status control unit 12 of the master instruction processor initializes the processing environment of the instruction processors 3-1 and 3-2 and controls the operations of the performance measurement unit 13 of its own processor and the environment setting unit 15 of the slave processor. The performance measurement unit 13 issues an instruction to be measured and measures an execution time of the instruction by using a time-of-day (TOD) clock or CPU timer provided in the system. In the embodiment of FIG. 2, it is assumed that the master and slave processors access the same memory area of the main storage 1 to create a competition state. When the performance measurement unit 13 issues the instruction to be measured under the control of the status control unit 12, the environment setting unit 15 of the slave instruction processor issues an instruction to access to the memory area of the storage 1 to which the instruction to be measured accesses, in order to create a pseudo competition state. After the measurement, the control is transferred to the edit output unit 14 and the result of measurement is outputted.

Figure 3:
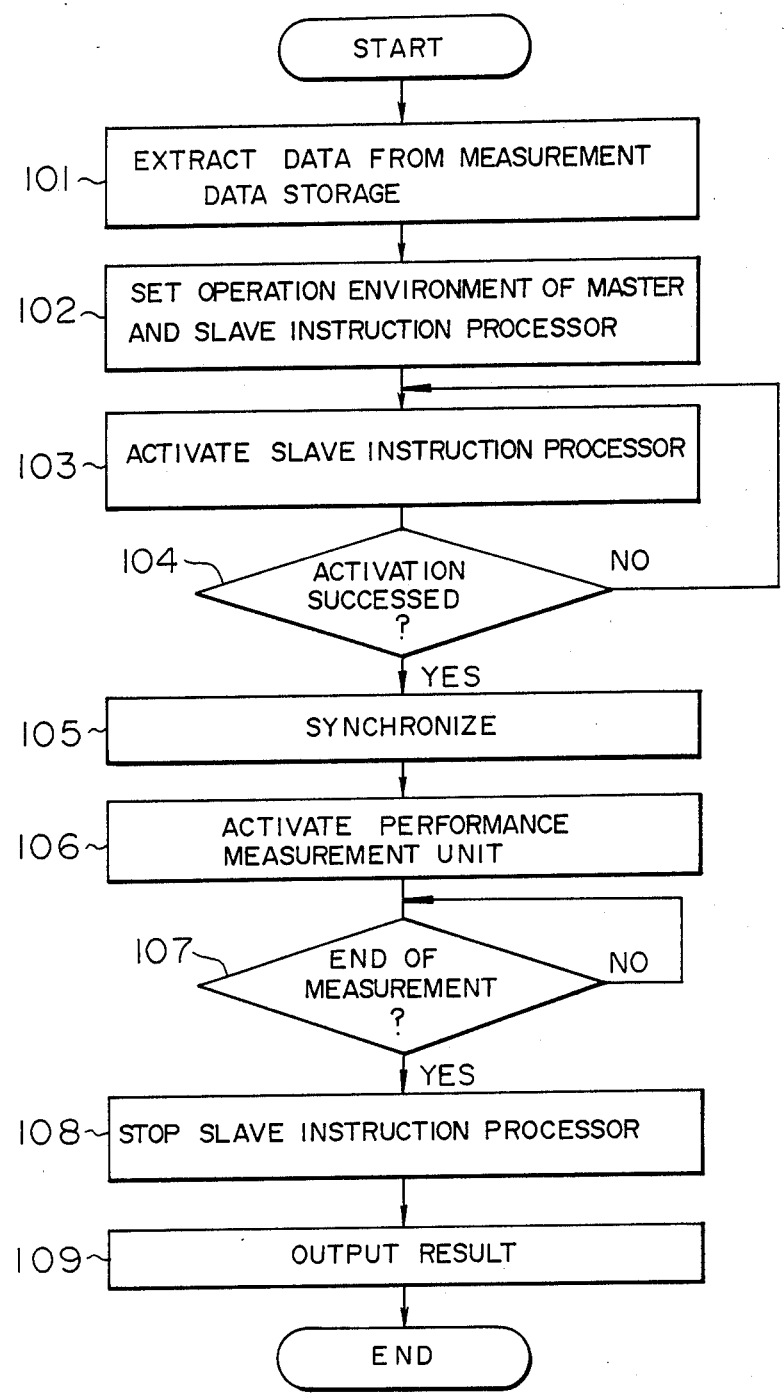
FIG. 3 shows a flow chart of an operation of the embodiment of FIG. 2.

FIG. 3 shows a processing flow chart of the status control unit 12. The status control unit 12 of the master instruction processor extracts the data from the measurement data storage 11 through the service processor 6 (step 101), initializes the operation environment of the master and slave instruction processor 3-1 and 3-2 (initialization of address conversion table, buffer storage and main storage area) in accordance with the extracted information, initializes the performance measurement unit 13 and the environment setting unit 15 (step 102), activates the slave instruction processor and waits for report of operation (steps 103 and 104). When the activation is accepted, the status control unit 12 carries out a process for synchronizing the processings of the performance measurement unit 13 and the environment setting unit 15 so that they are carried out at the same timing (step 105), and then it transfers the control to the performance measurement unit 13 (step 106). At the end of the measurement, the performance measurement unit 13 reports the termination and transfers the control to the status control unit 12. During this period, the slave instruction processor repeatedly carries out the operation to create the competition state of the instruction execution. When the status control unit 12 receives the report of termination of measurement (step 107), it stops the processing of the slave instruction processor (step 108) and activates the edit output unit 14 through the performance measurement unit 13 to cause it to output the measurement result (step 109).

Figures 4, 5:
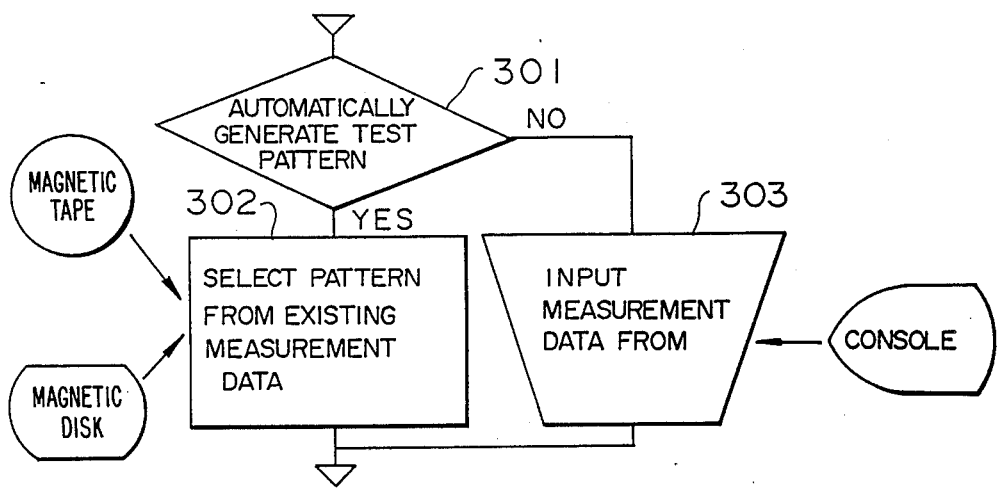
FIG. 4 shows an entry for performance measurement data.
FIG. 5 shows a flow chart for inputting measurement data.

FIG. 4 shows an example of main part of an entry for the measurement data entered from the measurement data unit 11. The entry sets a format 201 of an instruction to be tested, a code 202 of that instruction, a format 203 of a competiting instruction, a code 204 of the competing instruction, a competition state 205, a purge RAM 206 and information 207 of competing address. For example, as the format 201 of the instruction to be tested and the format 203 of the competing instruction, an instruction format RX which represents that the instruction relates to data transfer between a register and a memory is written. In the present embodiment, the competition state is caused by the master processor accessing the main storage and the slave processor also accessing the main storage.

In order to create the competition state, it is necessary to clear the content of the purge RAM. For example, a translation look-aside buffer (TLB) or buffer storage (BS) is designated. As information of the competing addresses, the common column or bank of the addresses is written.

FIG. 5 shows a flow chart of reading the measurement data in place of the step 101 of FIG. 3 when the measurement data is read from a magnetic disk file, magnetic tape or console. In reading the measurement data, whether a test pattern is to be automatically generated or not is checked (step 301), and if it is to be generated, the measurement data stored in the magnetic tape or magnetic disk file is selected (step 302). If it is not to be automatically generated, the measurement data is inputted from the console (step 303).

Figure 6:
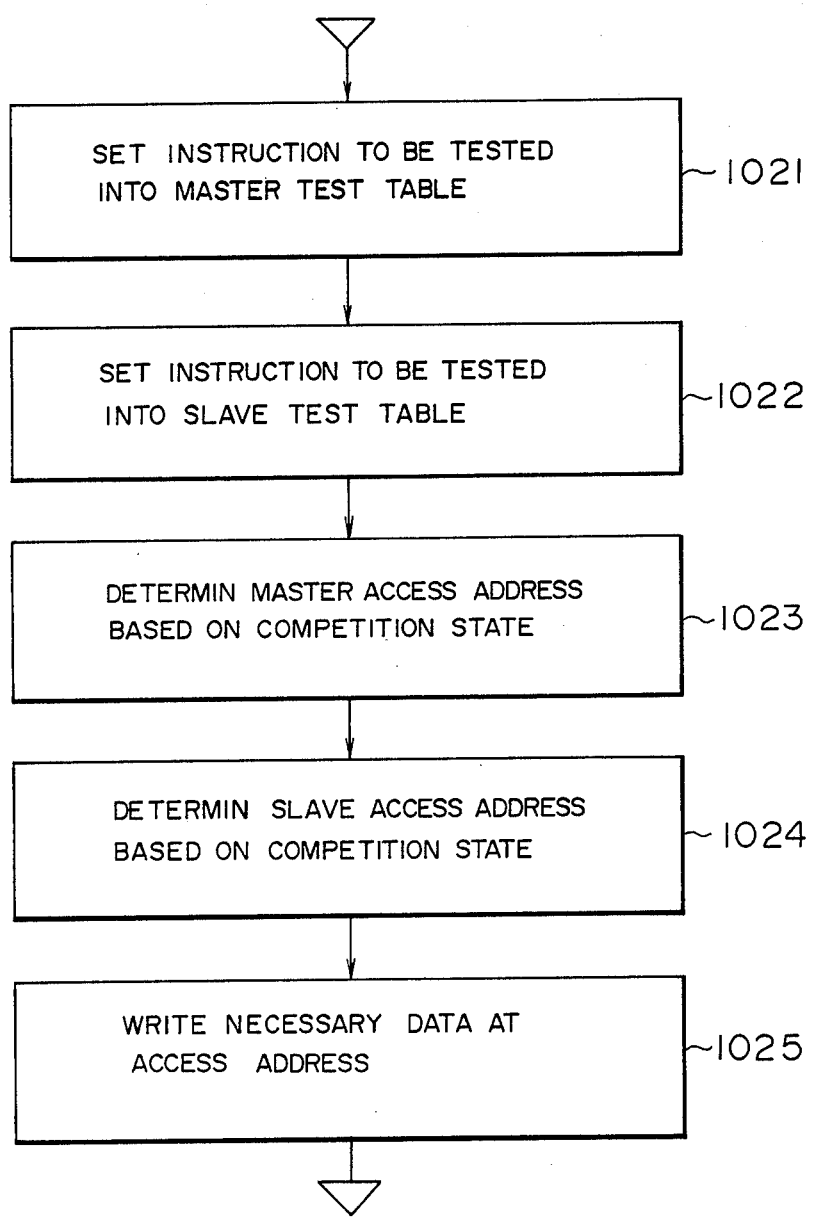
FIG. 6 shows a flow chart for setting performance measurement operation environment.

FIG. 6 shows a flow chart of setting the operation environment of the master and slave instruction processors in the step 102 of FIG. 3. In setting the operation environment, the instruction to be tested is set in the master table in the main storage controlled by the master processor (step 1201), the instruction to be tested is set in a slave test table in the main storage controlled by the slave processor (step 1022), the main storage address to be accessed by the master processor is determined based on the competition state specified as the measurement address (step 1023), the main storage address to be accessed by the slave processor is determined in accordance with the competition state (step 1024), and necessary data are written into addresses of the main storage (step 1025). When access is to be made to other unit than the main storage or to data to create the competition state, the access addresses to the unit or data of the master processor and slave processor are determined.

Figure 7:
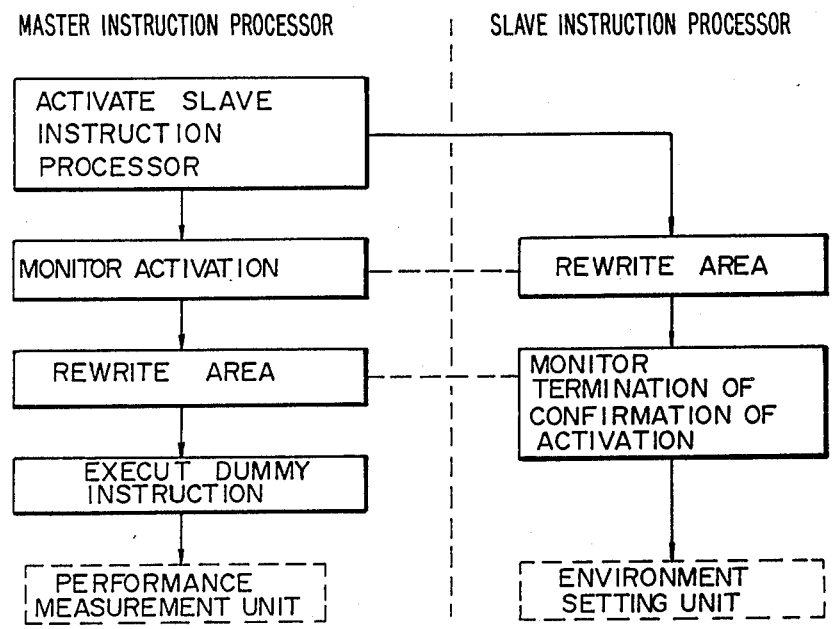
FIG. 7 shows one embodiment of synchronous processing.

FIG. 7 shows an embodiment of the synchronization process 105 of FIG. 3. As the master instruction processor 3-1 activates the slave instruction processor 3-2 and reports the operation, the processings of the processors are rendered asynchronous. Since the performance measurement unit 13 of the master instruction processor and the environment setting unit 15 of the slave instruction processor must synchronously issue instructions, it is necessary to synchronize the processings of the instruction processors 3-1 and 3-2 prior to the start of processing. After the master instruction processor has activated the slave instruction processor, the slave instruction processor monitors the rewriting of a specific area in the main storage 1 in order to confirm the success of activation. When the specific area has been updated, the master instruction processor rewrites the same specific area in the main storage in a similar manner and the slave instruction processor monitors the specific area to check the termination of the activation confirmation by the master instruction processor. After the specific area has been updated, the control is transferred to the environment setting area 15. During this period, since the program execution is carried out in advance by the master instruction processor, the status control unit 12 executes a dummy instruction (which has no connection with the processing) before the control is transferred to the performance measurement unit 13 to match the processing timing of the master and slave processors. It is possible to change the timing of the processing competition between the instruction processors by adjusting the execution time of the dummy instruction.

Figure 8:
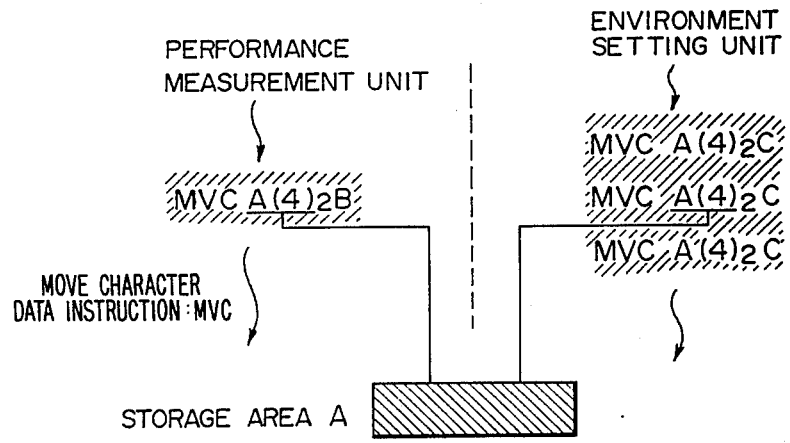
FIG. 8 shows an example of competition of instruction execution in the present invention.

FIG. 8 shows an example of the instruction execution competition operation in the performance measurement unit 13 of the master instruction processor and the environment setting unit 15 of the slave instruction processor.

The performance measurement unit 13 of the master instruction processor issues a move character data (MVC) instruction to be tested and writes 4-byte data in a storage area B of the storage 1 into a storage area A. The environment setting unit 15 of the slave instruction processor also issues the MVC instruction and writes 4-byte data in a storage area C into the storage area A. Accordingly, the write requests of the master and slave instruction processors 3-1 and 3-2 compete at the storage control unit 2. As a result, the performance measurement unit 13 of the master instruction processor can measure the processing performance (processing time) for the MVC instruction at the time of occurrence of the competition. By storing various information patterns in the measurement data storage unit 11 of the magnetic disk 7, the competition in the read operation, competition in the write operation and competition in read and write operations can be virtually created. The system operation environment may be set in any manner (when the competition in the buffer storage, competition in the main storage or data transfer between the buffer storage and the main storage is created).

In the present embodiment, the computer system has two instruction processors, although the performance can be measured in a computer system having a plurality of instruction processors.

In order to create the competition state for the plurality of processors, the master instruction processor sets the environment to create the competition state for each processor, activates the slave processors, synchronizes the slave processors and executes the competing instruction.

I claim:

1. A method for measuring performance of a multiprocessor having a plurality of processors and common resources shared by the processors, comprising the steps of:

assigning any one of said plurality of processors as a master processor and other processors as slave processors and extracting by said master processor, from an external unit, measurement data for creating a competition state in which said master processor and at least one slave processor of said slave processors access said common resources;

activating said at least one slave processor by said master processor to cause said at least one slave processor to issue an instruction to access said common resources and issuing by said master processor an instruction to access said common resources to create said competition state; and measuring instruction execution time by said master processor.

2. A method for measuring performance of a multiprocessor according to claim 1, wherein said common resources includes a main storage.

3. A method for measuring performance of a multiprocessor according to claim 1, wherein said measurement data includes format and code of an instruction to be tested and to be executed by the master processor, format and code of a competing instruction to be executed by the slave processor and a competition state to be set.

4. An apparatus for measuring performance of a multiprocessor having a plurality of processors and common resources shared by said processor, comprising:

means for inputting measurement data to create a competition state in which said common resources is accessed by any one of said processors as a master processor and other processors as slave processors;

a status control unit provided in said master processor for sending an activation command to an environment setting unit and controlling a performance measurement unit to create a competition state;

said environment setting unit provided in at least one of said slave processors for issuing an instruction to access said common resources;

said performance measurement unit provided in said master processor for issuing an instruction to access said common resources and measuring an instruction execution time under said competition state.

5. An apparatus for measuring performance of a multiprocessor according to claim 4 wherein said measurement data includes format and code of an instruction to be tested and to be executed by said master processor, format and code for a competing instruction to be executed by said at least one slave processor and a competition state to be set.

6. An apparatus for measuring performance of a multiprocessor according to claim 5, wherein said common resources include a main storage.

7. A method for measuring performance of a multiprocessor having a plurality of processors and resources shared by the processors, comprising the steps of:

assigning any one of the processors as a master processor and other processors as slave processors;

activating a slave processor of said slave processors by said master processor to cause said slave processor to issue an instruction to access said common resources and said master processor to issue an instruction to access said common resources to create a competition state; and measuring instruction execution time by said master processor.

* * * * *